July 17, 1951 E. J. ROBICHAUD 2,561,035
MACHINE TOOL

Filed March 12, 1947 2 Sheets-Sheet 1

INVENTOR.
Edmund J. Robichaud
BY Walter E. Ross
Attorney

Inventor
Edmund J. Robichaud
By Walter C. ___
Attorney

Patented July 17, 1951

2,561,035

UNITED STATES PATENT OFFICE 2,561,035

MACHINE TOOL

Edmund J. Robichaud, Middletown, Conn.

Application March 12, 1947, Serial No. 734,006

2 Claims. (Cl. 164—38)

This invention relates to machine tools.

The principal objects of the invention are directed to the provision of a machine tool which is constructed and arranged in a novel manner to facilitate ease, efficiency and low cost operation in the forming of successive pieces of work.

In the broad aspects of the invention, the machine is adapted to operate on successive work pieces and to form successive pieces of work from bar stock material.

According to novel features of the invention, end portions of a bar of stock or pieces of work are machined in a novel manner and without the use of a stop as ordinarily employed in machine tools thereby obviating the time lost in the operation of a stock stop and increasing productive time. This is accomplished by means which positions a formed piece of work so that it functions as a stop and the positioning means is in rotation at the same speed as the end of the stock bar or piece of work whereby friction between the pieces is eliminated so as to not injure the work pieces.

In ordinary machines, the finished work is discharged into the chip pan so that work and chips must be subsequently separated so that at best the work requires cleaning. Also, a piece of work is frequently thrown by the revolving spindle of present day spindles as it is released and creates a hazard. According to this invention, the completed work passes out through a spindle so that it does not become entangled with chips and the safety hazard is eliminated.

In the operation of the machine in forming a piece on the end of a bar, the bar is fed by means which receives the bar so that feeding means is eliminated and the time lost in the operation of feeding means is saved so as to increase productive time.

Where the machine operates on work pieces instead of on bar stock a component which receives the piece functions as the feeding means and discharges a piece of work whereby mechanism for feeding and discharging work is eliminated as well as the operating time therefor so that the productive time of the machine is again increased.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figure 1:
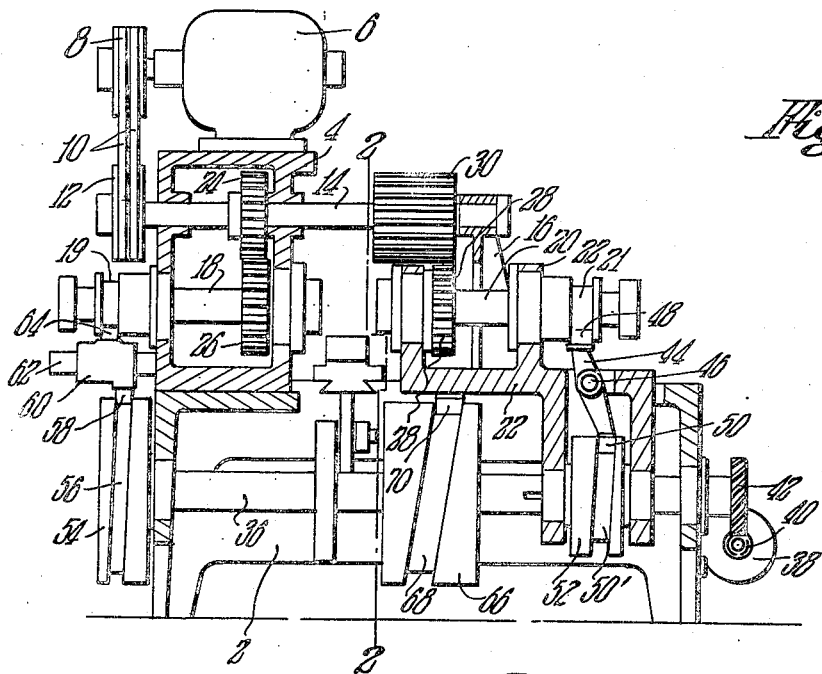
Fig. 1 is a longitudinal sectional view through a machine tool embodying the novel features of the invention.

Figs. 3 to 8 inc. are diagrammatic views showing operation of the principal components of the machine on work pieces; and Figs. 9 to 14 inc. are similar views to explain the operation of said components on bar stock.

Referring now to the drawings more in detail, the invention will be fully described.

A supporting base is represented by 2 which has a housing 4 secured thereto at one end thereof.

A drive motor 6 is secured to the housing which has a pulley 8 connected by belts 10 to a pulley 12 fixed on a shaft 14. Said shaft is rotatable in the housing and in a bracket 16 secured to the bed 2.

A primary spindle 18 and a secondary spindle 20 are rotatable in the housing 2 and in a carriage 22 which is slidable back and forth relative to the housing.

Said spindles are rotatable on aligned axes and are similar in construction and of the hollow type adapted for the passage of bar stock or work pieces therethrough. Such spindles are provided with collets adapted to contract for gripping a bar of stock or to expand to release the same. The collets are arranged for endwise movements in the spindles between gripping and releasing positions by actuating means such as collars 19 and 21. Such a spindle as is adapted for the practice of the invention is shown in the U. S. Patent to Ruppel No. 2,310,259 of February 9, 1943.

Gears 24 and 26 connect shaft 14 with spindle 18 and a gear 28 fixed on spindle 20 is in mesh with and is slidable relative to a gear 30 fixed on shaft 14.

A cam shaft 36 is rotatably mounted in the base and is driven by a motor 38 having a gear 40 in mesh with a gear 42 fixed to said shaft 36.

A lever 44 is pivoted at 46 to slide 22 and has a roll 48 in the collar 21 of spindle 20. A roll 50 on the lower end of lever 44 engages a groove 50' of a cam 52 fixed to shaft 36. As the cam rotates the collar 21 is acted upon to actuate the collet of spindle 20.

A cam 54 has a groove 56 in which is a roll 58 of a slide 60 that is movable back and forth on a stud 62 fixed to the housing. A roll 64 on said member 60 engages collar 19 to open and close the collet of spindle 18.

A cam 66 fixed on shaft 36 has a groove 68 which receives a roll 70 of carriage 22 so that the carriage is moved back and forth by rotation of cam 66.

Tool slides 72 and 74 are slidable back and forth on the bed and transversely to the axes of the spindles 18 and 20 and are provided with slots 76 for receiving tool devices for acting on work pieces or bar stock carried by the spindles.

Figure 2:
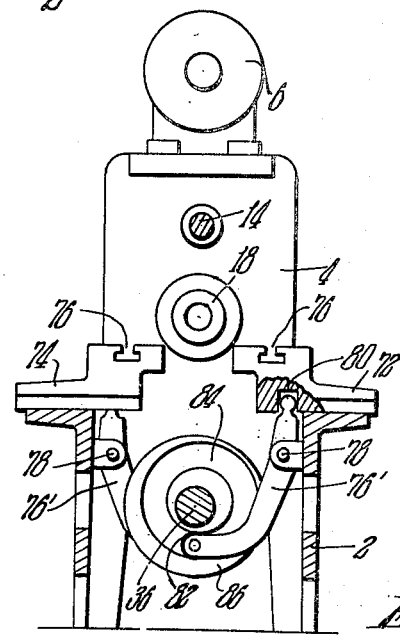
Fig. 2 is a sectional view on the line 2—2 of Fig. 1.

Levers such as 76' are pivoted at 78 to the base and have upper ends in sockets 80 of the slides, as shown in Fig. 2. Lower ends of the levers 76 carry rolls 82 received in grooves such as 84 on opposite sides of a cam 86 fixed to shaft 36. As cam 86 rotates the levers move the slides back and forth so that cutting tools carried thereby may act on work pieces or bar stock carried by the spindles.

The spindles 18 and 20 are rotated simultaneously and preferably at the same speed and in the same direction. The cam shaft is rotated at such a speed as will cause the collets of the spindles to be opened or closed and the cross slides and carriage to move back and forth in the desired timed relation.

The operation of the machine will first be described in connection with work pieces in Figs. 3 to 8 inc. In these figures the collet of the primary spindle is represented by full lines 18' and that of the secondary spindle by dash lines 20'. An unfinished work piece of work is represented by 90, a partially finished piece of work by 92 and a finished piece by 94.

Figure 3:
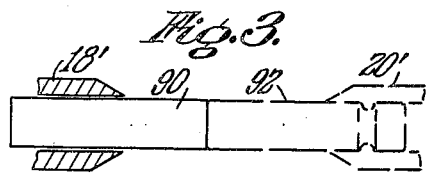

In the position of the parts in Fig. 3, the collet 20' has a partly finished piece of work gripped thereby. An unfinished piece of work 90 has been fed forwardly in spindle 18 by any suitable means and it abuts piece 92 which acts as a stop therefor.

When piece 90 abuts piece 92, collet 18' closes and spindle 20 is retracted. Then the tool slides back and forth so that tools thereof operate on opposite ends of adjacent work pieces, such as forming annular grooves 96, as in Fig. 6.

Figure 7:
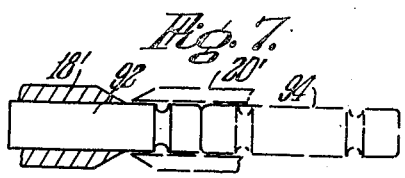

Thereafter collet 20' opens and spindle 20 moves towards spindle 18 as in Fig. 7 so that work piece 92 is received in collet 20'.

Figure 8:
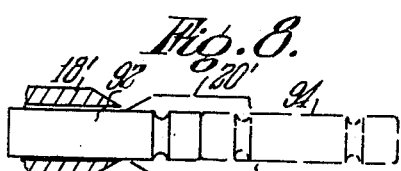

Then collet 20' closes on work piece 92 as in Fig. 8 and the spindle 20' moves to the left to its stop position of Fig. 3, and carrying the work piece so that it is in position to act as a stop for a subsequent piece, as in Fig. 3. As the partially formed work piece is received in collet 20', the previous finished work piece is moved outwardly of the spindle. In this way finished work pieces are ejected out the rear end of spindle 20'.

The operation of the machine will now be described with reference to Figs. 9 to 14 inc. In this case a bar of stock is represented by 96, a partly finished piece of work by 98 and a finished piece by 100.

Figure 9:
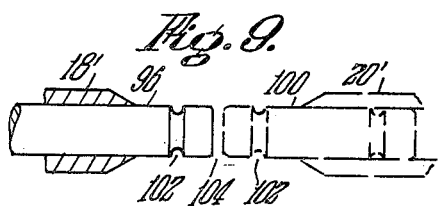
Figure 4:
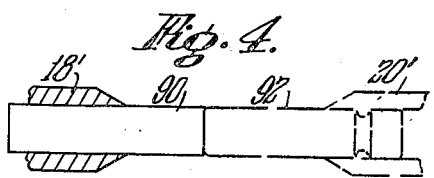

In Fig. 9 collet 20' is gripping a finished piece of work 100 and collet 18' is gripping a bar of stock. A machining operation has been performed as at 102 on the bar 96 and piece and the same have been separated at 104 by operation of one of the slides.

Figure 10:
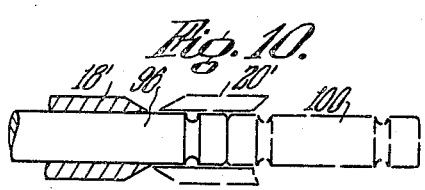
Figure 5:
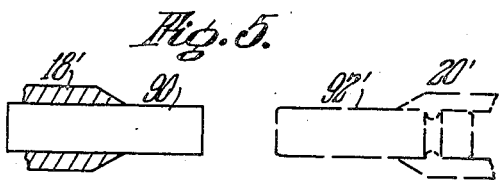

Spindle 20 and collet 20' move to the left and said collet is opened as in Fig. 10 so that the end of the stock bar 96 is received therein.

Figure 11:
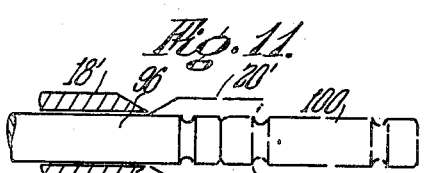
Figure 6:
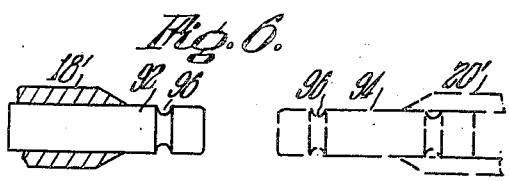
Figure 12:
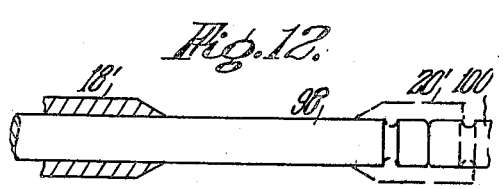

The collet 20' is closed, the collet 18' is opened, as in Fig. 11, and then the spindle 20 and collet 20' move away from spindle 18 as in Fig. 12; the collet 20' feeds the bar inwardly.

Figure 13:
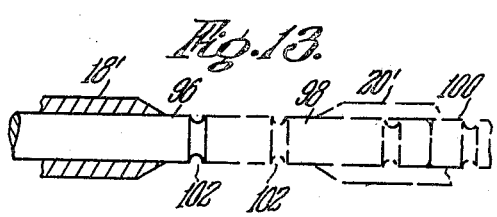
Figure 14:
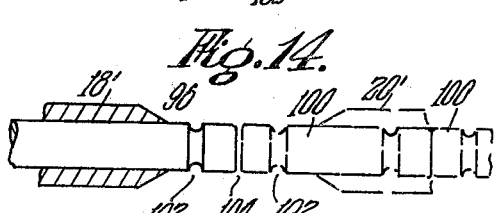

Then with both collets in rotation the operation at 102 is performed as in Fig. 13 and finally the work piece is separated from the bar at 104 by operation of one of the slides as in Figs. 14 and 9.

It will be noted by reference to Figs. 3 to 8 inc. that the partially finished work piece acts as a stop for an unfinished piece of work and that in either case the collet 20' functions to feed the bar of stock or the piece of work.

In all cases the finished pieces of work are discharged through the spindle 20 whereby said pieces are not contaminated with chips and the like. Also since the bar or pieces of work are in the collets there is no opportunity of the collets and spindles being contaminated with chips and the like.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A machine of the class described comprising in combination, a supporting structure having a housing fixed thereto, a carriage reciprocable on said supporting structure towards and away from the housing, a primary hollow spindle and a secondary hollow spindle in axial alignment and rotatable in the housing and said carriage respectively, a drive shaft rotatable in the housing and supporting structure disposed in parallelism with said spindles, separate operating means connecting said drive shaft with said spindles, means for reciprocating said carriage including a cam shaft, independently operable collet means carried by said spindles for gripping work pieces, and separate cam means operatively connecting the cam shaft and said collet means for operating the latter.

2. A machine of the class described comprising in combination, a supporting structure having a housing fixed thereto, a carriage reciprocable on said structure towards and away from the housing, a primary hollow spindle rotatable in the housing, a secondary hollow spindle rotatable in said carriage, a drive shaft rotatable in the housing and said structure disposed in parallelism with said spindles, separate operating means connecting said drive shaft with said spindles, primary cam means for reciprocating said carriage, independently operable collet means carried by said spindles for gripping work pieces, and secondary cam means operatively connecting said primary cam means and collets for operating the latter, tool carriers reciprocable in said structure on opposite sides of said spindles and transversely relative thereto, and tertiary cam means operatively connecting said primary cam means and tool carriers arranged for simultaneous reciprocation thereof.

EDMUND J. ROBICHAUD.

REFERENCES CITED

The following references are of record in the file of this patent:

UNITED STATES PATENTS

| Number | Name | Date |
| --- | --- | --- |
| 2,377,383 | Slovak | June 5, 1945 |
| 2,377,384 | Slovak | June 5, 1945 |